United States Patent Office 2,766,884
Patented Oct. 16, 1956

---

2,766,884

PROCESS FOR SEPARATING SODIUM CHLORIDE FROM KAINITE BY MEANS OF FLOTATION

Gerlando Marullo and Giovanni Perri, Milan, Italy, assignors to Montecatini societa generale per l'Industria Mineraria e Chimica, a corporation of Italy No Drawing. Application September 27, 1954, Serial No. 458,698

Claims priority, application Italy October 5, 1953

4 Claims. (Cl. 209—166)

The present invention relates to a process for separating sodium chloride from kainite.

The herein application represents a continuation-in-part of U. S. patent application Serial No. 408,591 of February 5, 1954.

Kainite mineral ($KCl.MgSO_4.3H_2O$) generally occurs in nature accompanied by such amounts of sodium chloride that profitable utilization of the kainite is prevented or restricted.

In most cases a previous purification is therefore necessary which consists in separating the kainite fraction from the sodium chloride fraction.

Processes of a chemical nature for the separation of the two fractions are tedious, and it seems that economically satisfactory results cannot be attained thereby.

Although a number of such separation processes has been proposed, only two have attained industrial application, but under particular circumstances, and even these two processes have been abandoned.

In the first of these two processes, namely that of Precht, crude kainite is treated, in a properly designed device at high temperature and under pressure, with a magnesium chloride solution having a concentration ranging from 100 to 200 g./l., so as to give rise to a new double salt of the composition $2MgSO_4.K_2SO_4$ (langbeinite) which has a finely divided structure that is utilized for separating the newly formed langbeinite (by means of a suitable perforated drum mounted inside of the reaction device) from sodium chloride the particle size of which remains unchanged.

In the last-named process, magnesium chloride solutions of relatively higher concentration (350 to 400 g./l.) are employed and the operation is carried out at high temperature (110 to 120° C.), but at normal pressure.

Under these conditions, potassium chloride and magnesium chloride are obtained in solution whereas magnesium sulfate in the form of kieserite and sodium chloride remain undissolved.

As stated before, these processes represent the best solutions of the problem among the hitherto suggested processes. However, they cannot be regarded as satisfactory because a number of technological problems arise from the use of pressures and high temperatures in conjunction with magnesium chloride solutions.

For these reasons, the possibility has been investigated of separating the useful fraction from the impurities by physical means, particularly by means of flotation.

It is apparent that any successful flotation process could result in two possibilities, viz. concentrating in the frothy supernate either the kainite or the impurities to be removed.

As has been set forth in the afore-named patent application, these applicants have succeeded in separating substantially pure kainite by concentrating kainite in the frothy supernate. The object of this invention is to attain a separation by concentrating the impurities in the frothy supernate.

We made the unexpected discovery that, by carrying out the flotation process in the presence of a branched chain amine as cationic agent, sodium chloride rather than kainite is brought into the frothy supernate. An almost complete separation takes place and a flotated portion of sodium chloride is obtained which contains 1 to 2% $K_2O$ at most and flotation tails containing 96 to 97% of kainite.

In order to prevent reconversion reactions between residual salts and those suspended in the fluid portion, we have found it necessary to operate with solutions having a high content of magnesium chloride; this prevents the dissolution of salts forming the raw material. It should be noted in this connection that when the suitably ground raw mineral is placed in water in order to form the turbid flotation liquid, salts contained in the raw mineral are not only dissolved but chemical reactions take place as well, one of them being the fundamental reaction whereby kainite is converted into Schönite according to the following formula:

$$2KCl.MgSO_4.3H_2O \rightarrow K_2SO_4.MgSO_4.6H_2O + MgCl_2$$

These reactions depend on a number of factors, such as time, fineness of grind of the mineral, temperature, amount of circulating water, and others.

A flotation carried out with an unmodified solution fails not only with respect to efficiency of operation, but is also wasteful in the consumption of flotation agents. In contrast thereto, if solutions suitably buffered with magnesium chloride are employed, the above-mentioned drawbacks are entirely eliminated.

For instance, when using in conjunction with the flotation process a solution containing 300 to 350 g./l. of magnesium chloride, concentrates of constant percentage and yield are obtained.

Obviously, the process disclosed by this invention requires an adequate recovering of mother liquors.

A preferred variation of the flotation process of this invention comprises the following steps:

1. The raw mineral is ground either dry or wet in the buffer solution, to such a fineness that grains comprising the individual constituents of the mineral are physically separated from each other.

2. A turbid suspension containing 30 to 40% of the ground mineral is made up with the afore-mentioned buffer solution.

3. The turbid solution is treated with a lead salt e. g. lead nitrate, the amount of which being as high as 200–500 grammes for one metric ton raw mineral, and with a specific cationic reagent constituted by an acid salt of a branched-chain amine, the trimethylhexylamine hydrochloride, the preferred amounts of which, required for the process, ranging from 100 to 250 grammes for metric ton raw mineral, said turbid solution being brought to flotation by gradually adding small amounts of amyl alcohol, said amounts ranging from 50 to 100 grammes for one metric ton raw mineral. Other organic substances which may be employed as frothing agents are toluene, xylene, cyclohexanol. The flotation is continued for 10 to 20 minutes until a frothy supernate is formed which, aside from the flotation liquid, contains 96 to 98% of the sodium chloride. The flotation tails, viz. the solid contained in the turbid discharge of the flotation cells, comprise the kainite with no more than 1 to 2% of sodium chloride as impurity.

4. Concentrates and tails are separated from the liquid by filtration or centrifugation and the liquid is recycled. Unavoidable solution losses due to moisture remaining in the filter cakes are replaced with fresh solution buffered with $MgCl_2$.

By operating in this manner, a product of a very high kainite content can be obtained, irrespective of the $K_2O$ content of the raw mineral.

Obviously, the method will be particularly useful with kainite minerals having a sodium chloride content equal or lower than the $K_2O$ content.

If the sodium chloride content of the kainite mineral is higher than 50%, the process disclosed in U. S. patent application Serial No. 408,591 is preferable.

The table below illustrates the results of three separation trials made according to the invention.

|  | $K_2O$, percent | NaCl, percent | Percent $MgCl_2$ take-up found after flotation | $K_2O$ yield |
| --- | --- | --- | --- | --- |
| (a) |  |  |  |  |
| Raw mineral | 8.5 | 55.2 |  |  |
| Floated | 1.5 | 90.0 | 2.1 | 10 |
| Residue | 18.0 | 3.0 | 2.0 | 90 |
| (b) |  |  |  |  |
| Raw mineral | 12.5 | 34.2 |  |  |
| Floated | 1.5 | 90.0 | 2 | 4 |
| Residue | 18.0 | 3.0 | 2 | 96 |
| (c) |  |  |  |  |
| Raw mineral | 14.0 | 26.3 |  |  |
| Floated | 2.0 | 87.5 | 2 | 3.7 |
| Residue | 18.2 | 2.2 | 2 | 96.3 |

Because of its solubility, the magnesium chloride contained in the residue is readily removable by washing with a very limited amount of water. Such a washing can be carried out in the final step of filtration.

From a consideration of the above-mentioned results, it will be apparent that this invention furnishes an economic method of separating kainite from rock salt, permitting the recovery of the former at very high yields.

We claim:

1. A process for separating substantially pure kainite from a crude mineral consisting substantially of kainite associated with large amounts of sodium chloride, the said process comprising the steps of grinding the said crude mineral sufficiently fine to physically separate the individual constituents of the crude mineral from each other, mixing it with an amount of magnesium chloride solution sufficient to produce a turbid fluid, adding a lead salt and an acid salt of trimethylhexylamine in amounts sufficient to produce flotation, agitating, adding gradually a member selected from the group consisting of amyl alcohol, toluol, xylol and cyclohexanol in amounts sufficient to convert the turbid fluid into a frothy suspension, removing substantially pure kainite in form of precipitated solids and separating from the said frothy suspension most of the sodium chloride.

2. A process for separating substantially pure kainite from a crude mineral consisting substantially of kainite associated with large amounts of sodium chloride, the said process comprising the steps of grinding the said crude mineral in a 30 to 35% magnesium chloride solution until the individual constituents of the crude mineral separate physically from each other, adding sufficient magnesium chloride solution to produce a turbid suspension comprising 30 to 40% of the ground, crude mineral, adding lead nitrate and an acid salt of trimethylhexylamine in amounts sufficient to produce flotation, agitating, adding gradually an amount of amyl alcohol sufficient to convert the turbid fluid into a frothy suspension, removing substantially pure kainite in form of precipitated solids and separating from the said frothy suspension most of the sodium chloride.

3. A process for separating substantially pure kainite from a crude mineral consisting substantially of kainite associated with large amounts of sodium chloride, the said process comprising the steps of grinding the said crude mineral sufficiently fine to physically separate the individual constituents of the crude mineral from each other, mixing it with an amount of a 30 to 35% magnesium chloride solution sufficient to produce a turbid suspension comprising 30 to 40% of the ground, crude mineral, adding a lead salt and trimethylhexylamine hydrochloride in amounts sufficient to produce flotation, agitating, adding gradually an amount of amyl alcohol sufficient to convert the turbid fluid into a frothy suspension, removing substantially pure kainite in form of precipitated solids and separating from the said frothy suspension most of the sodium chloride.

4. A process for separating substantially pure kainite from a crude mineral consisting substantially of kainite associated with large amounts of sodium chloride, the said process comprising the steps of grinding the said crude mineral sufficently fine to physically separate the individual constituents of the crude mineral from each other, mixing it with an amount of a 30 to 35% magnesium chloride solution sufficient to produce a turbid suspension comprising 30 to 40% of the ground, crude mineral, adding 200 to 500 gr. of lead nitrate and 100 to 250 gr. of trimethylhexylamine hydrochloride per metric ton of raw material, agitating, adding gradually 50 to 100 gr. of amyl alcohol per metric ton of raw material to convert the turbid fluid into a frothy suspension, continuing the agitation for 10 to 20 minutes, removing substantially pure kainite in form of precipitated solids and separating from said frothy suspension most of the sodium chloride.

References Cited in the file of this patent

UNITED STATES PATENTS 2,672,236  Weinig _____ Mar. 16, 1954
2,702,121  Colin et al. _____ Feb. 15, 1955